US011701274B2

(12) United States Patent
Ko et al.

(10) Patent No.: US 11,701,274 B2
(45) Date of Patent: Jul. 18, 2023

(54) DRIVING WHEEL AND MOBILITY VEHICLE INCLUDING SAME

(71) Applicants: HYUNDAI MOTOR COMPANY, Seoul (KR); KIA CORPORATION, Seoul (KR)

(72) Inventors: Hun Keon Ko, Anyang-si (KR); Hyun Kyoo Park, Anyang-si (KR); Jea Kyoo An, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/387,759

(22) Filed: Jul. 28, 2021

(65) Prior Publication Data

US 2022/0168161 A1 Jun. 2, 2022

(30) Foreign Application Priority Data

Nov. 27, 2020 (KR) .................. 10-2020-0162404

(51) Int. Cl.
| | | |
|---|---|---|
| *A61G 5/04* | (2013.01) | |
| *B60B 9/28* | (2006.01) | |
| *B60B 25/02* | (2006.01) | |
| *A61G 5/06* | (2006.01) | |
| *B60B 9/26* | (2006.01) | |
| *B60B 19/04* | (2006.01) | |
| *B60B 15/10* | (2006.01) | |

(52) U.S. Cl.
CPC .............. *A61G 5/041* (2013.01); *A61G 5/065* (2013.01); *B60B 9/26* (2013.01); *B60B 9/28* (2013.01); *B60B 15/10* (2013.01); *B60B 19/04* (2013.01); *B60B 25/02* (2013.01); *B60B 2900/551* (2013.01)

(58) Field of Classification Search
CPC .......... A61G 5/065; A61G 5/061; A61G 5/10; A61G 5/068; A61G 5/06; B60B 19/04; B60B 25/02
See application file for complete search history.

(56) References Cited

U.S. PATENT DOCUMENTS

| | | | | |
|---|---|---|---|---|
| 1,408,885 A | * | 3/1922 | Humphrey | ............. B60B 15/06 |
| | | | | 301/46 |
| 3,995,909 A | * | 12/1976 | van der Lely | .......... B60B 15/26 |
| | | | | 301/47 |
| 4,923,554 A | * | 5/1990 | Ozawa | ................. B29D 30/242 |
| | | | | 156/126 |
| 7,503,567 B2 | | 3/2009 | Frankie | |

(Continued)

FOREIGN PATENT DOCUMENTS

| | | | | |
|---|---|---|---|---|
| CN | 108032678 A | * | 5/2018 | |
| CN | 109203846 A | * | 1/2019 | ............. B60B 19/04 |

(Continued)

*Primary Examiner* — Emma K Frick
(74) *Attorney, Agent, or Firm* — Lempia Summerfield Katz LLC

(57) ABSTRACT

A driving wheel includes: a first disc provided to be rotatable with respect to a rotary shaft; a second disc provided to be rotatable with respect to the rotary shaft; a plurality of spokes each protruding outward and each having a first side rotatably coupled to the first disc and a second side rotatably coupled to the second disc; a first motor to rotate the first disc; and a second motor to rotate the second disc.

18 Claims, 8 Drawing Sheets

(56) References Cited

U.S. PATENT DOCUMENTS

| | | | | |
|---|---|---|---|---|
| 8,007,341 | B2 * | 8/2011 | Su | A63H 17/262 |
| | | | | 446/431 |
| 9,757,978 | B1 * | 9/2017 | Emigh | B60B 9/28 |
| 10,173,463 | B2 * | 1/2019 | Barel | B60B 9/24 |
| 10,214,050 | B1 * | 2/2019 | Ebrahimi Afrouzi | B60B 19/12 |
| 10,518,576 | B1 * | 12/2019 | Ebrahimi Afrouzi | |
| | | | | B60B 19/003 |
| 10,766,300 | B2 * | 9/2020 | Goren | F16H 9/10 |
| 2022/0097450 | A1 * | 3/2022 | Kim | B60B 19/02 |

FOREIGN PATENT DOCUMENTS

| | | | | |
|---|---|---|---|---|
| CN | 112223951 A | * | 1/2021 | B60B 19/00 |
| CN | 112472440 A | * | 3/2021 | A61G 5/061 |
| KR | 20110138307 A | * | 12/2011 | |
| KR | 20220043434 A | * | 4/2022 | |
| KR | 20220072538 A | * | 6/2022 | |
| WO | WO-2013191581 A1 | * | 12/2013 | A61G 5/02 |
| WO | WO-2021153935 A1 | * | 8/2021 | |
| WO | WO-2022036546 A1 | * | 2/2022 | |

* cited by examiner

DRIVING WHEEL AND MOBILITY VEHICLE INCLUDING SAME

CROSS-REFERENCE TO RELATED APPLICATION

This application claims priority to and the benefit of Korean Patent Application No. 10-2020-0162404, filed on Nov. 27, 2020, the entire contents of which are incorporated herein by reference.

FIELD

The present disclosure relates to a driving wheel and a mobility vehicle including the same.

BACKGROUND

The statements in this section merely provide background information related to the present disclosure and may not constitute prior art.

A mobility vehicle, such as a wheelchair, often travels not only in an indoor place where a floor is flat, but also in an outdoor place where a road surface is irregular. Therefore, the mobility vehicle needs to ensure not only ride quality but also traveling performance so that the mobility vehicle may easily pass through an uneven region formed on the road surface while traveling.

Meanwhile, in the related art, in order to ensure the ride quality and the traveling performance of the mobility vehicle, linear actuators are often mounted in the mobility vehicle to individually provide power to wheels or spokes, which are provided in the mobility vehicle, in accordance with an environment of the road surface. However, we have discovered that a large number of linear actuators are required to sufficiently ensure the ride quality and the traveling performance, which causes low energy efficiency and low responsiveness to a change in situation of the road surface.

SUMMARY

The present disclosure has been made in an effort to provide a driving wheel and a mobility vehicle that have a simple structure, thereby implementing high responsiveness and high energy efficiency.

In one aspect, the present disclosure provides a driving wheel including: a rotary shaft; at least one first disc provided to be rotatable with respect to the rotary shaft; at least one second disc provided to be rotatable with respect to the rotary shaft; a plurality of spokes each having a first side rotatably coupled to the at least one first disc and a second side rotatably coupled to the at least one second disc and having a shape protruding outward; a first motor configured to rotate the first disc; and a second motor configured to rotate the second disc.

The first sides of the plurality of spokes may be arranged at equal intervals around the rotary shaft, and the second sides of the plurality of spokes may be arranged at equal intervals around the rotary shaft.

In one form, the second sides of the plurality of spokes are radially inwardly arranged with respect to the first sides of the plurality of spokes.

The first disc may include: a first body coupled to the rotary shaft; and first protruding parts protruding outward from the first body and each having one side coupled to the first side of each of the plurality of spokes.

The second disc may include: a second body coupled to the rotary shaft; and second protruding parts protruding outward from the second body and each having one side coupled to the second side of each of the plurality of spokes.

The two first discs may be provided, and the two first discs may be spaced apart from each other in a width direction W.

The second disc may be provided in an internal space provided between the two first discs in the width direction W.

The spoke may include: a first spoke extending outward from the first side; and a second spoke extending from the first side to the second side.

The first spoke and the second spoke may be provided in a straight line.

A distance from the rotary shaft to the first side may be longer than a distance from the rotary shaft to the second side.

The second body may be fixedly coupled to the rotary shaft so as not to move relative to the rotary shaft, and the second motor may be connected directly to the rotary shaft.

The second body may be formed integrally with the rotary shaft.

An external gear may be provided on an outer surface of the first body provided in a radial direction R, and the first motor may engage with the external gear.

The driving wheel may further include a support part provided on an outer end portion of the spoke and protruding in a circumferential direction A of the driving wheel.

The support part may be provided to be rotatable with respect to the spoke.

The driving wheel may further include a first elastic part having one side being in close contact with the support part and the other side being in close contact with the spoke.

The driving wheel may further include a second elastic part provided in the first spoke and extending from an outer end portion of the first spoke to the first side.

The driving wheel may further include a bearing provided between the rotary shaft and the first body.

In another aspect, the present disclosure provides a mobility vehicle including: one or more driving wheels, in which the driving wheel includes: a first disc provided to be rotatable with respect to a rotary shaft; a second disc provided to be rotatable with respect to the rotary shaft; a plurality of spokes each having a first side coupled to the first disc and a second side coupled to the second disc and having a shape protruding outward; a first motor configured to rotate the first disc; and a second motor configured to rotate the second disc, and in which the spoke is provided to be rotatable about the first side with respect to the first disc, and the spoke is provided to be rotatable about the second side with respect to the second disc.

The mobility vehicle may be a wheelchair.

According to the present disclosure, it is possible to manufacture the driving wheel and the mobility vehicle that have a simple structure, thereby implementing high responsiveness and high energy efficiency.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
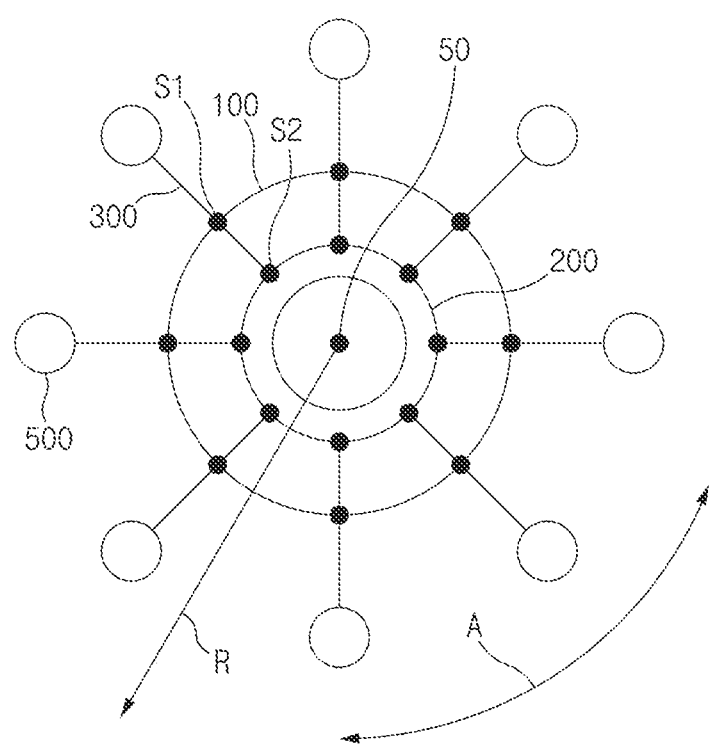
FIGS. 1 and 2 are views schematically illustrating a structure and an operational principle of a driving wheel according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a driving wheel and a mobility vehicle according to some forms of the present disclosure will be described with reference to the drawings.

Driving Wheel

Figure 2:
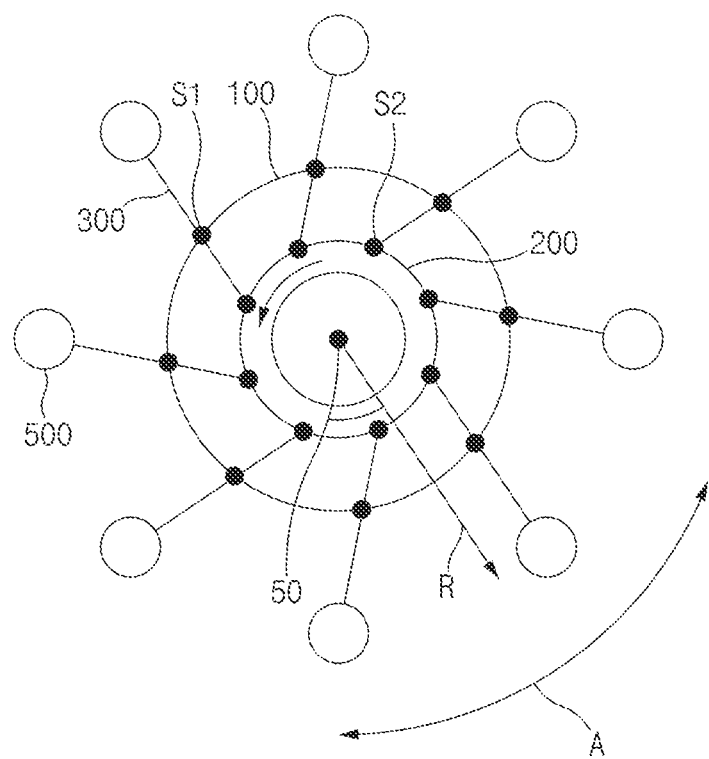

FIGS. 1 and 2 are views schematically illustrating a structure and an operational principle of a driving wheel according to one form of the present disclosure.

As illustrated in FIGS. 1 and 2, a driving wheel 10 may include a rotary shaft 50, a first disc 100 provided to be rotatable with respect to the rotary shaft 50, and a second disc 200 provided to be rotatable with the rotary shaft 50. FIGS. 1 and 2 illustrate that an outer diameter of the first disc 100 is larger than an outer diameter of the second disc 200. However, the structure of the driving wheel 10 according to the present disclosure is not limited thereto.

In addition, the driving wheel 10 may further include spokes 300 each having a shape protruding outward in a radial direction R of the driving wheel 10. In this case, the plurality of spokes 300 may be provided. FIGS. 1 and 2 illustrate that the eight spokes 300 are provided, for example.

Meanwhile, the spokes 300 may be combined with the first disc 100 and the second disc 200. In more detail, as illustrated in FIGS. 1 and 2, the spoke 300 may be coupled to the first disc 100 at a first side S1 of the spoke 300 and coupled to the second disc 200 at a second side S2 of the spoke 300.

Meanwhile, although not illustrated in FIGS. 1 and 2, the driving wheel 10 may further include a first motor configured to rotate the first disc 100, and a second motor configured to rotate the second disc 200. In more detail, the first motor may be configured to provide rotational power to rotate the first disc 100 with respect to the rotary shaft 50, and the second motor may be configured to provide rotational power to rotate the second disc 200 with the rotary shaft 50. Meanwhile, the operation of the first motor and the operation of the second motor may be controlled independently. Therefore, the rotation of the first disc 100 and the rotation of the second disc 200 may also be performed independently.

In another form of the present disclosure, the spoke 300 may be provided to be rotatable about the first side S1 of the spoke 300 with respect to the first disc 100 and provided to be rotatable about the second side S2 of the spoke 300 with respect to the second disc 200.

Therefore, according to one form of the present disclosure, a degree to which the spoke 300 protrudes outward may be changed in accordance with a relative rotation between the first disc 100 and the second disc 200, and an outer diameter of the driving wheel 10 in the radial direction R may also be changed accordingly. For example, as illustrated in FIG. 1, the driving wheel 10 may have a maximum outer diameter in the radial direction R when the plurality of spokes 300 protrudes outward in a direction parallel to the radial direction R of the driving wheel 10. As illustrated in FIG. 2, when the second disc 200 rotates relative to the first disc 100, each of the spokes 300, which is coupled to the second disc 200 at the second side S2 thereof, may protrude outward so as to have a predetermined angle with respect to the radial direction R, such that the outer diameter of the driving wheel 10 in the radial direction R may be decreased. Therefore, according to the present disclosure, it is possible to adjust the outer diameter of the driving wheel 10 in the radial direction R in accordance with a height of a road surface while a mobility vehicle mounted with the driving wheel 10 travels, and it is also possible to easily adjust a height of the mobility vehicle. In particular, according to the present disclosure, the outer diameter of the driving wheel 10 may be easily adjusted by only the two power sources, that is, the first motor and the second motor, and as a result, it is possible to significantly improve responsiveness and energy efficiency of the driving wheel 10.

More particularly, according to another form of the present disclosure, magnitudes and directions of the angles defined between the plurality of spokes 300 and the radial direction R may be equal to one another regardless of an angle of the rotation of the second disc 200 relative to the first disc 100. In this case, the direction of the angle may mean a direction in which an outer end portion of the spoke 300 is inclined with respect to the radial direction R. This is to make the outer diameter of the driving wheel 10 in the radial direction R constant in the entire region of the driving wheel 10 regardless of the angle of the relative rotation of the second disc 200 with respect to the first disc 100. FIG. 2 illustrates that all the outer end portions of all the eight spokes 300 are inclined clockwise at the same angle.

In one form of the present disclosure, the plurality of first sides S1 of the plurality of spokes 300 may be provided at an equal interval in a circumferential direction A of the driving wheel 10 about the rotary shaft 50. The plurality of second sides S2 of the plurality of spokes 300 may also be provided at an equal interval in the circumferential direction A of the driving wheel 10 about the rotary shaft 50. For example, as illustrated in FIGS. 1 and 2, in the case in which the driving wheel 10 has the eight spokes, an angle defined between the two adjacent spokes may be 45 degrees. However, in a case in which the driving wheel 10 has twelve spokes, an angle defined between the two adjacent spokes may be 30 degrees. For example, a ratio of a length of the spoke 300 to the outer diameter of the first disc 100 in the radial direction R is approximately 1:1.4.

Figure 3:
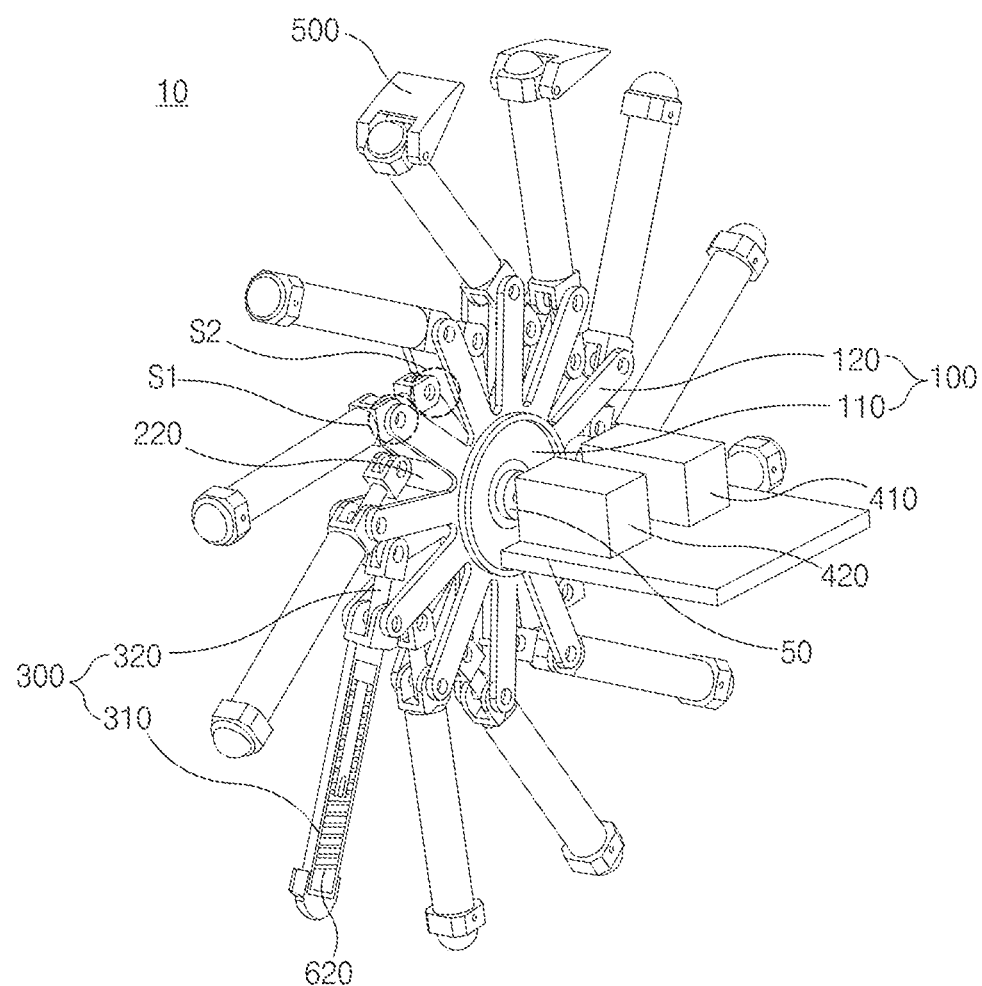
FIG. 3 is a perspective view illustrating a structure of the driving wheel according to one form of the present disclosure.
Figure 4:
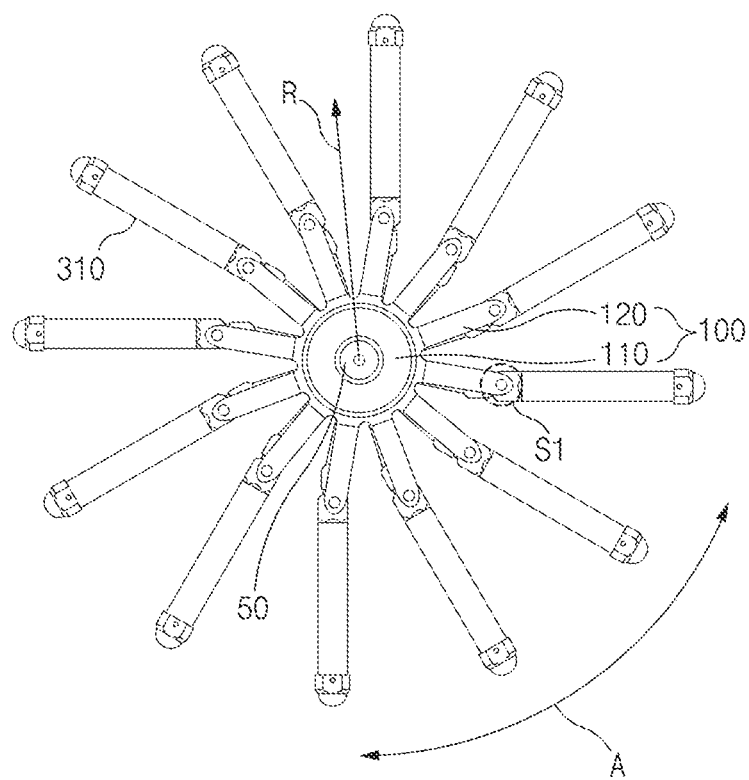
FIG. 4 is a view illustrating a structure of the driving wheel in a case in which the driving wheel has a large outer diameter in a radial direction in one form of the present disclosure.

FIG. 3 is a perspective view illustrating a structure of the driving wheel according to one form of the present disclosure, and FIG. 4 is a view illustrating a structure of the driving wheel in a case in which the driving wheel according to one form of the present disclosure has a large outer diameter in the radial direction. In addition, FIG. 5 is a view illustrating a structure of the driving wheel in a case in which the driving wheel has a small outer diameter in the radial direction, and FIG. 6 is a view illustrating a cross-sectional structure made by cutting the driving wheel in a width direction.

Figure 5:
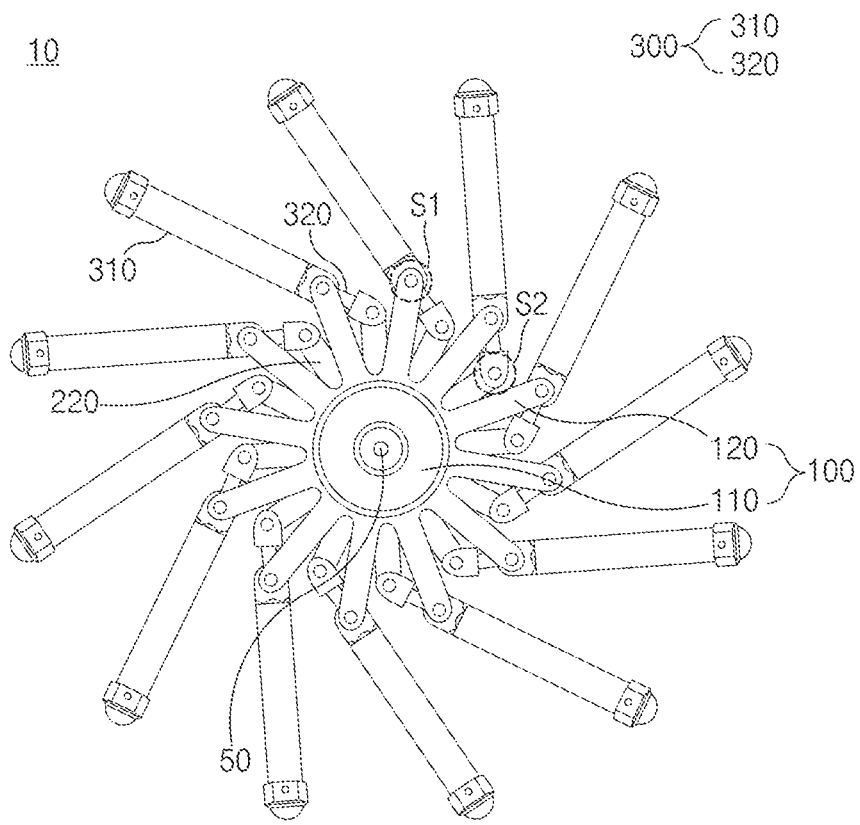
FIG. 5 is a view illustrating a structure of the driving wheel in a case in which the driving wheel has a small outer diameter in the radial direction in another form of the present disclosure

As illustrated in FIGS. 3 to 5, the first disc 100 of the driving wheel 10 may include a first body 110 coupled to the rotary shaft 50, and first protruding parts 120 protruding outward in the radial direction R from the first body 110 and combined, at one side thereof, with the first sides S1 of the spokes 300. In more detail, the first body 110 may have an approximately circular plate shape, and the first protruding part 120 may have an approximately rod shape. The number of first protruding parts 120 may be equal to the number of spokes 300. Therefore, the first protruding parts 120 and the spokes 300 may be combined in a one-to-one manner. In addition, the plurality of first protruding parts 120 may be provided at an equal interval in the circumferential direction A.

In another form, the second disc 200 of the driving wheel 10 may include a second body 210 coupled to the rotary shaft 50, and second protruding parts 220 protruding outward in the radial direction R from the second body 210 and combined, at one side thereof, with the second sides S2 of the spokes 300. In more detail, the second body 210 may have an approximately circular plate shape, and the second protruding part 220 may have an approximately rod shape. The number of second protruding parts 220 may be equal to the number of spokes 300. Therefore, the second protruding parts 220 and the spokes 300 may be combined in a one-to-one manner. In addition, the plurality of second protruding parts 220 may be provided at an equal interval in the circumferential direction A.

Figure 6:
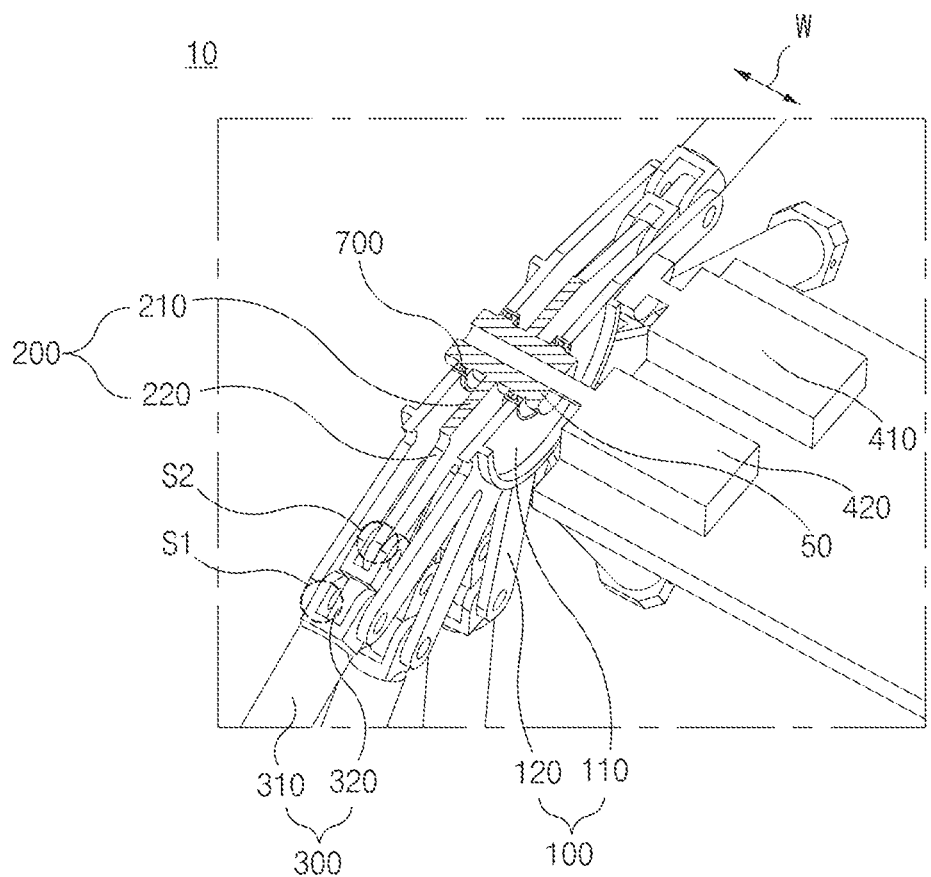
FIG. 6 is a view illustrating a cross-sectional structure made by cutting the driving wheel in a width direction in one form of the present disclosure.

Meanwhile, as illustrated in FIG. 6, the driving wheel 10 according to one form of the present disclosure may have two first discs 100. More particularly, the two first discs 100 may be provided to be spaced apart from each other in a width direction W of the driving wheel 10. Therefore, an internal space may be formed between the two first discs 100. In this case, the second disc 200 may be provided in the internal space between the two first discs 100 in the width direction W.

Continuing to refer to FIG. 6, each of the spokes 300 of the driving wheel 10 may include a first spoke 310 extending outward in the radial direction R from the first side S1, and a second spoke 320 extending inward in the radial direction R from the first side S1 to the second side S2. In one form of the present disclosure, the first spoke 310 and the second spoke 320 may be provided in a straight line regardless of the rotations of the first and second discs 100 and 200. That is, the first spoke 310 and the second spoke 320 may be fixedly coupled so as not to be rotated relative to each other. For example, the first spoke 310 and the second spoke 320 may be integrally formed. In addition, referring to FIG. 5, a distance from the rotary shaft 50 to the first side S1 may be longer than a distance from the rotary shaft 50 to the second side S2.

In another form, the second body 210 of the second disc 200 may be fixedly coupled to the rotary shaft 50 so as not to be moved relative to the rotary shaft 50, and the second motor 420 may be connected directly to the rotary shaft 50. Therefore, when the second motor 420 operates, i) the rotary shaft 50 connected directly to the second motor 420 rotates, ii) the second body 210 and the second protruding parts 220 also rotate together with the rotary shaft 50 accordingly, and iii) the angles defined between the second protruding parts 220 and the first protruding parts 120 are changed accordingly, such that the outer diameter of the driving wheel 10 in the radial direction R may be changed. For example, the second body 210 and the rotary shaft 50 may be integrally formed.

Continuing to refer to FIG. 6, an external gear may be provided on an outer surface of the first body 110 in the radial direction R of the driving wheel 10. In this case, a rotary shaft of the first motor 410 may be provided to engage with the external gear. Therefore, when the first motor 410 operates, i) the first body 110, which engages with the first motor 410 by means of the external gear, rotates, and iii) the first protruding parts 120 may also rotate accordingly.

Meanwhile, as described above, the first body 110 may be coupled to the rotary shaft 50. However, unlike the second body 210, the first body 110 may be coupled to the rotary shaft 50 so as to be rotatable relative to the rotary shaft 50. To this end, a bearing 700 may be provided between the rotary shaft 50 and the first body 110. Therefore, according to the present disclosure, when the rotary shaft 50 is rotated by the operation of the second motor 420, the second body 210 fixedly coupled to the rotary shaft 50 is rotated, whereas the first body 110 is rotated only by the operation of the first motor 410 regardless of whether the second motor 420 operates. Therefore, the rotation of the first disc 100 and the rotation of the second disc 200 may be independently performed.

Continuing to refer to FIG. 3, the driving wheel 10 according to one form of the present disclosure may further include support parts 500 provided on the outer end portions of the spokes 300 and protruding in the circumferential direction A of the driving wheel 10. In more detail, the support part 500 may be provided on the outer end portion of the first spoke 310 provided in the radial direction R. The support part 500 may be configured to come into direct contact with a road surface on which the driving wheel 10 travels. For convenience of description, FIG. 3 illustrates that the support parts 500 are combined with only some of the plurality of spokes 300. However, more particularly, the support parts 500 may be provided on all the spokes 300 of the driving wheel 10, respectively (see FIG. 8).

In this case, the support parts 500 are provided to be rotatable with respect to the spokes 300, particularly, the first spokes 310 in accordance with a state of the road surface on which the driving wheel 10 travels.

Figure 7:
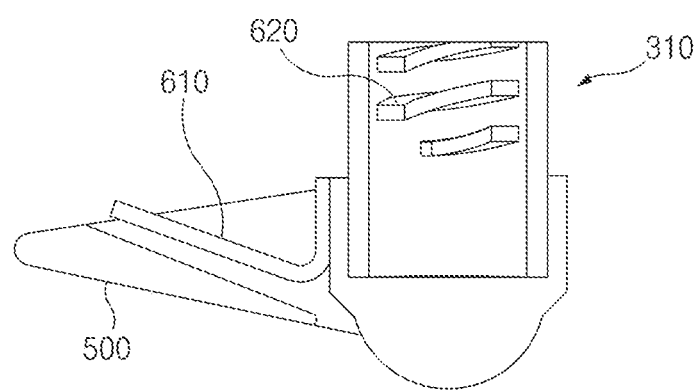
FIG. 7 is a cross-sectional view illustrating coupling relationships between a first spoke, a support part, and a first elastic part of the driving wheel according to one form of the present disclosure.

FIG. 7 is a cross-sectional view illustrating coupling relationships between the first spoke, the support part, and a first elastic part of the driving wheel according to one form of the present disclosure.

Referring to FIG. 7, the driving wheel 10 may further include a first elastic part 610 having one side being in close contact with the support part 500 and the other side being in close contact with the first spoke 310. Therefore, according to the present disclosure, even though the support part 500, which is in direct contact with the road surface, is rotated from the spoke 300 in accordance with a state of the road surface, the rotation angle of the support part 500 may be returned to an original state by elastic force of the first elastic part 610 when the support part 500 is separated from the road surface again. For example, as illustrated in FIG. 7, the first elastic part 610 may have a shape made by bending a plate, and based on the bent region, one side of the first elastic part 610 may be in close contact with the support part 500, and the other side of the first elastic part 610 may be in close contact with the first spoke 310.

Meanwhile, referring back to FIG. 3, the driving wheel 10 according to the present disclosure may further include a second elastic part 620 provided in the first spoke 310 and extending to the first side S1 from the outer end portion of the first spoke 310 provided in the radial direction R. Even in a case in which impact is applied to the driving wheel 10 from the road surface while the driving wheel 10 travels, the second elastic part 620 may provide supporting force in order to maintain a shape of the driving wheel 10 which is made before the impact is applied. The second elastic part 620 may also be provided to reduce the amount of torque required for the second motor 420 to rotate the second disc 200. To this end, the second elastic part 620 may press an inner surface provided in the outer end portion in the radial direction R and press an inner surface provided in an inner end portion in the radial direction R, at the same time, among the inner surfaces of the first spoke 310.

Hereinafter, a method of operating the driving wheel 10 according to some forms of the present disclosure will be described with reference to the above-mentioned descriptions and FIGS. 1 to 7.

When an environment of the road surface is changed while the driving wheel 10 travels, the second motor 420 operates, the second body 210 and the second protruding parts 220 of the second disc 200 are rotated, and thus the angles between the first protruding parts 120 and the second protruding parts 220 are changed, such that the outer diameter of the driving wheel 10 in the radial direction R is changed. For example, when there is a region protruding upward from the road surface in front of the driving wheel 10 in a traveling direction of the driving wheel 10, the driving wheel 10 travels after increasing the angle between the first protruding part 120 and the second protruding part 220 in order to change a shape of the driving wheel 10 from the shape illustrated in FIG. 1 to the shape illustrated in FIG. 2 or from the shape illustrated in FIG. 4 to the shape illustrated in FIG. 5. On the contrary, when there is a region recessed downward from the road surface in front of the driving wheel 10 in the traveling direction of the driving wheel 10, the driving wheel 10 travels after decreasing the angle between the first protruding part 120 and the second protruding part 220 in order to change a shape of the driving wheel 10 from the shape illustrated in FIG. 2 to the shape illustrated in FIG. 1 or from the shape illustrated in FIG. 5 to the shape illustrated in FIG. 4. Therefore, according to the present disclosure, even though there is an uneven region on the road surface, the mobility vehicle may travel in a state in which a change in overall height of the mobility vehicle having the driving wheel 10 is minimized. Accordingly, it is possible to significantly improve ride quality of the mobility vehicle. Meanwhile, when the driving wheel 10 travels on a flat road surface without changing the angle between the first protruding part 120 and the second protruding part 220, the first motor 410 and the second motor 420 may operate in such a manner that a rotational angular velocity of the first disc 100 and a rotational angular velocity of the second disc 200 implemented by the second motor 420 are equal to each other.

Mobility Vehicle

Figure 8:
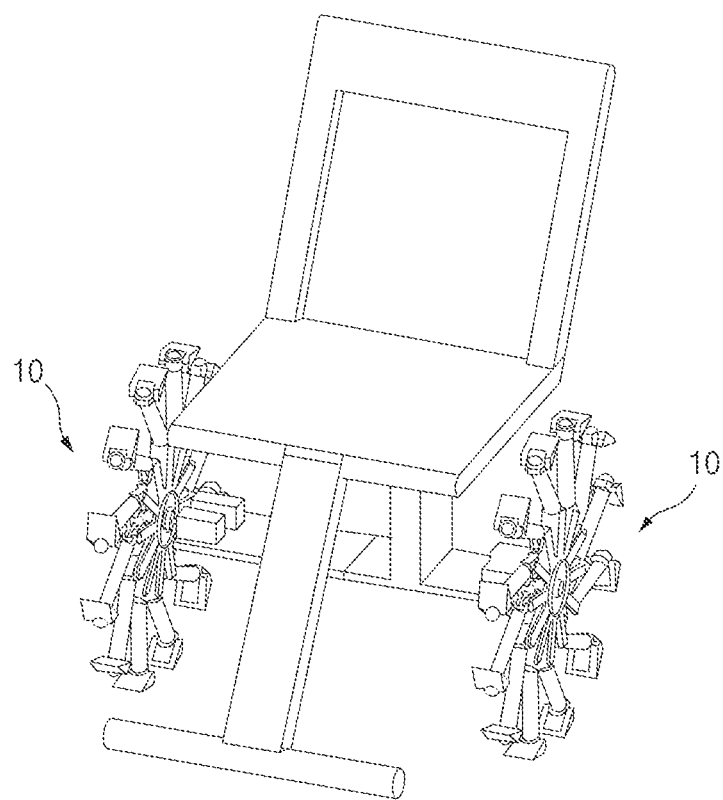
FIG. 8 is a perspective view illustrating an example of a structure of a mobility vehicle to which the driving wheel according to one form of the present disclosure may be applied.

FIG. 8 is a perspective view illustrating an example of a structure of a mobility vehicle to which the driving wheel according to one form of the present disclosure may be applied.

Referring to FIGS. 1 to 8, a mobility vehicle 20 according to one form of the present disclosure may include one or more driving wheels 10. For example, the mobility vehicle 20 may include two driving wheels 10.

In this case, the driving wheel 10 may include the first disc 100 provided to be rotatable with respect to the rotary shaft 50, the second disc 200 provided to be rotatable with respect to the rotary shaft 50, the plurality of spokes 300 each having the shape protruding outward in the radial direction R and having the first side S1 coupled to the first disc 100 and the second side S2 coupled to the second disc 200, the first motor 410 configured to rotate the first disc 100, and the second motor 420 configured to rotate the second disc 200. In this case, the spoke 300 may be provided to be rotatable about the first side S1 with respect to the first disc 100 and provided to be rotatable about the second side S2 with respect to the second disc 200.

Meanwhile, the mobility vehicle according to the present disclosure may be a mobility vehicle that travels at a low speed. For example, as illustrated in FIG. 8, the mobility vehicle according to the present disclosure may be a wheelchair.

The present disclosure has been described with reference to the limited forms and the drawings, but the present disclosure is not limited thereto. The described forms may be carried out in various forms by those skilled in the art to which the present disclosure pertains within the technical spirit of the present disclosure.

What is claimed is:

1. A driving wheel comprising:
   a rotary shaft;
   at least one first disc provided to be rotatable with respect to the rotary shaft;
   at least one second disc provided to be rotatable with the rotary shaft;
   a plurality of spokes each configured to protrude outward and each including:
      a first part rotatably coupled to the at least one first disc, and
      a second part rotatably coupled to the at least one second disc;
   a first motor configured to rotate the at least one first disc;
   a second motor configured to rotate the at least one second disc,
   wherein the plurality of spokes each comprises:
      a first spoke extending outward from the first part, and
      a second spoke extending from the first part to the second part; and
   an elastic part provided in the first spoke of a corresponding spoke among the plurality of spokes and configured to support the second spoke with respect to an outer end portion of the first spoke of the corresponding spoke.

2. The driving wheel of claim 1, wherein:
   the first parts of the plurality of spokes are arranged at equal intervals around the rotary shaft, and
   the second parts of the plurality of spokes are arranged at equal intervals around the rotary shaft.

3. The driving wheel of claim 2, wherein the second parts of the plurality of spokes are radially inwardly arranged with respect to the first sides parts of the plurality of spokes.

4. The driving wheel of claim 1, wherein the at least one first disc comprises:
   a first body coupled to the rotary shaft; and
   first protruding parts protruding outward from the first body and each having one side coupled to the first part of each spoke of the plurality of spokes.

5. The driving wheel of claim 4, wherein the at least one second disc comprises:
   a second body coupled to the rotary shaft; and
   second protruding parts protruding outward from the second body and each having one side coupled to the second part of each spoke of the plurality of spokes.

6. The driving wheel of claim 5, wherein the at least one first disc comprises two first discs, and the two first discs are spaced apart from each other in a width direction.

7. The driving wheel of claim 6, wherein the at least one second disc is provided in an internal space formed between the two first discs in the width direction.

8. The driving wheel of claim 5, wherein the second body is fixedly coupled to the rotary shaft so as not to move relative to the rotary shaft, and the second motor is connected directly to the rotary shaft.

9. The driving wheel of claim 8, wherein the second body is formed integrally with the rotary shaft.

10. The driving wheel of claim 8, further comprising:
    a bearing provided between the rotary shaft and the first body.

11. The driving wheel of claim 4, wherein an external gear is provided on an outer surface of the first body provided in a radial direction, and the first motor is configured to engage with the external gear.

12. The driving wheel of claim 1, wherein the first spoke and the second spoke are provided in a straight line.

13. The driving wheel of claim 1, wherein a distance from the rotary shaft to the first part is longer than a distance from the rotary shaft to the second part.

14. The driving wheel of claim 1, further comprising:
    a support part provided on an outer end portion of a corresponding spoke of the plurality of spokes and configured to protrude in a circumferential direction of the driving wheel.

15. The driving wheel of claim 14, wherein the support part is provided to be rotatable with respect to the corresponding spoke.

16. The driving wheel of claim 15, further comprising:
    a first elastic part including: a first part being in contact with the support part and a second part being in contact with the corresponding spoke.

17. A mobility vehicle comprising:
    at least one driving wheel, wherein the at least one driving wheel comprises:
      a first disc provided to be rotatable with respect to a rotary shaft;
      a second disc provided to be rotatable with the rotary shaft;
      a plurality of spokes each configured to protrude outward and each having a first part rotatably coupled to the first disc and a second part rotatably coupled to the second disc,
    wherein the plurality of spokes each comprises:
      a first spoke extending outward from the first part, and
      a second spoke extending from the first part to the second part;
      a first motor configured to rotate the first disc;
      a second motor configured to rotate the second disc; and
      an elastic part provided in the first spoke of a corresponding spoke among the plurality of spokes and configured to support the second spoke with respect to an outer end portion of the first spoke of the corresponding spoke.

18. The mobility vehicle of claim 17, wherein the mobility vehicle is a wheelchair.

* * * * *